(12) United States Patent
Polavarapu et al.

(10) Patent No.: US 9,417,383 B2
(45) Date of Patent: Aug. 16, 2016

(54) THREE-DIMENSIONAL ELECTRONIC PHOTONIC INTEGRATED CIRCUIT FABRICATION PROCESS

(71) Applicant: BAE SYSTEMS Information & Electronic Systems Integration Inc., Nashua, NH (US)

(72) Inventors: Murty S. Polavarapu, Oakston, VA (US); Andrew T. S. Pomerene, Leesburg, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 67 days.

(21) Appl. No.: 14/324,592

(22) Filed: Jul. 7, 2014

(65) Prior Publication Data

US 2015/0016770 A1    Jan. 15, 2015

Related U.S. Application Data

(60) Provisional application No. 61/844,669, filed on Jul. 10, 2013.

(51) Int. Cl.
*G02B 6/12* (2006.01)
(52) U.S. Cl.
CPC ................................. *G02B 6/12002* (2013.01)
(58) Field of Classification Search
None
See application file for complete search history.

(56) References Cited

U.S. PATENT DOCUMENTS

| 8,842,945 | B2 * | 9/2014 | Nguyen | 385/1 |
|---|---|---|---|---|
| 2006/0177173 | A1 * | 8/2006 | Shastri | G02B 6/42 385/14 |
| 2009/0263923 | A1 * | 10/2009 | Shimooka | G02B 6/4214 438/31 |
| 2009/0294814 | A1 * | 12/2009 | Assefa | H01L 25/167 257/292 |
| 2010/0111473 | A1 * | 5/2010 | Pinguet | G02B 6/124 385/37 |
| 2010/0119192 | A1 * | 5/2010 | Fujikata | B82Y 20/00 385/14 |
| 2011/0216997 | A1 * | 9/2011 | Gothoskar | G02B 6/12007 385/14 |
| 2013/0181233 | A1 * | 7/2013 | Doany | H01L 21/76251 257/88 |

OTHER PUBLICATIONS

Batude et al. Advances, Challenges and Opportunities in 3D CMOS Sequential Integration. 2011 pp. 7.3.1-7.3.4. IEEE, Dec. 5, 2011.

* cited by examiner

*Primary Examiner* — Tina Wong
(74) *Attorney, Agent, or Firm* — Maine Cernota & Rardin; Scott J. Asmus

(57) ABSTRACT

A device and the process for creating a three-dimensional electronic photonic circuit is disclosed. The process includes fabricating a standard high performance integrated circuit on a high resistivity silicon or a silicon-on-insulator substrate up to and including the passivation layer on top of transistors. Separately, a silicon-on-insulator wafer capped by an oxide layer is fabricated, then the two wafers are joined. The resultant device has photonic process elements (e.g. waveguides and photodetectors) fabricated in the top silicon layer. Continued processing interconnects the transistors and photonic elements with contacts and metallization levels to produces an electronic-photonic integrated circuit.

20 Claims, 6 Drawing Sheets

STEP FIVE

STEP ONE

STEP TWO

STEP THREE

STEP FOUR

STEP FIVE

FLOW CHART

THREE-DIMENSIONAL ELECTRONIC PHOTONIC INTEGRATED CIRCUIT FABRICATION PROCESS

RELATED APPLICATIONS

This application claims the benefit of U.S. Provisional Application No. 61/844,669 filed 10 Jul. 2013. This application is herein incorporated by reference in its entirety for all purposes.

FIELD OF THE INVENTION

The invention relates to a device and fabrication method for three-dimensional electronic photonic integrated circuits.

BACKGROUND OF THE INVENTION

Existing photonic elements and high frequency CMOS devices are not easily integrated. While CMOS devices have previously been vertically integrated with transistors, or horizontally with transistors and photonics, this has not been attempted vertically because of the difficulties associated with the process. Previous elements lack the high frequency transistors combined with photonic process elements. Chip area is at a premium, and it is wasted by horizontal integration of transistor devices and photonic process elements. In the current high performance silicon integrated circuits fabricated by commercial manufacturers, process modules for photonic elements such as waveguides and detectors cannot be easily inserted. Additionally, such insertion of photonic process modules consumes valuable chip area and can create interference between the photonic elements and the CMOS. What is needed is a method of fabricating three-dimensional electronic photonic integrated circuits that avoids complex processes, reduces interference, and preserves valuable chip area.

SUMMARY OF THE INVENTION

An embodiment provides a method for fabricating a three-dimensional electronic photonic integrated circuit comprising fabricating an integrated circuit wafer; fabricating separately a silicon-on-insulator photonic wafer; either joining the wafers at an oxide-to-oxide interface, or fabricating photonic process elements in the photonic wafer; fabricating photonic process elements in the photonic wafer if not previously accomplished; and interconnecting the transistors and the photonic process elements whereby functionality of an electronic-photonic integrated circuit is obtained. In embodiments the integrated circuit wafer comprises a high resistivity silicon substrate. In other embodiments, the integrated circuit wafer comprises a silicon-on-silicon insulator substrate. In subsequent embodiments the integrated circuit wafer comprises a passivation layer. For additional embodiments the integrated circuit wafer comprises a passivation layer on top of at least one transistor. In another embodiment, the silicon-on-insulator photonics wafer comprises an oxide layer cap. For a following embodiment joining comprises standard thermal bonding techniques. In subsequent embodiments the silicon-on-insulator photonic wafer comprises a top silicon layer. In additional embodiments the photonic process elements are fabricated in a top silicon layer of the photonic wafer. In included embodiments the interconnecting comprises contacts and metallization levels.

Another embodiment provides a three-dimensional electronic photonic integrated circuit device manufactured by a process comprising fabricating an integrated circuit wafer; fabricating separately a silicon-on-insulator photonic wafer; either joining the wafers at an oxide-to-oxide interface, or fabricating photonic process elements in the photonic wafer; fabricating photonic process elements in the photonic wafer if not previously accomplished; and interconnecting the transistors and the photonic process elements whereby functionality of an electronic-photonic integrated circuit is obtained. In yet further embodiments the integrated circuit wafer comprises a high resistivity silicon substrate. In related embodiments the integrated circuit wafer comprises a silicon-on-silicon insulator substrate. For further embodiments the integrated circuit wafer comprises a passivation layer. In ensuing embodiments the integrated circuit wafer comprises a passivation layer on top of at least one transistor. For yet further embodiments, the silicon-on-insulator photonics wafer comprises an oxide layer cap. For more embodiments, joining comprises standard thermal bonding techniques. Continued embodiments include that the photonic process elements are fabricated in a top silicon layer of the photonic wafer. For additional embodiments, interconnecting comprises contacts and metallization levels.

A yet further embodiment provides a three-dimensional electronic photonic integrated circuit manufactured by a process comprising fabricating a standard high performance integrated circuit wafer on a high resistivity silicon or a silicon-on-silicon insulator substrate up to and including a passivation layer on top of at least one transistor; fabricating a silicon-on-insulator photonic wafer capped by an oxide layer; fabricating photonic process elements in a top silicon layer of the photonic wafer; joining the wafers at an oxide-to-oxide interface using standard thermal bonding techniques; and interconnecting the transistors and the photonic process elements with contacts and metallization levels to achieve functionality of an electronic-photonic integrated circuit.

DETAILED DESCRIPTION

The following detailed description provides example embodiments of the presently claimed invention with references to the accompanying drawings. The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. Embodiments are described in sufficient detail to enable one of ordinary skill in the art to practice the subject invention. The invention is susceptible of many embodiments. What follows is illustrative, but not exhaustive, of the scope of the invention.

The current invention is a process to fabricate a high performance silicon integrated circuit and join to it a silicon wafer with a single crystal silicon layer. With such a structure, photonic elements can be fabricated on the top silicon layer independent of the bottom high performance circuit, saving valuable chip area. Those skilled in the art will appreciate the space savings as well as the reduced interference between the photonic elements and the CMOS.

Figure 1:
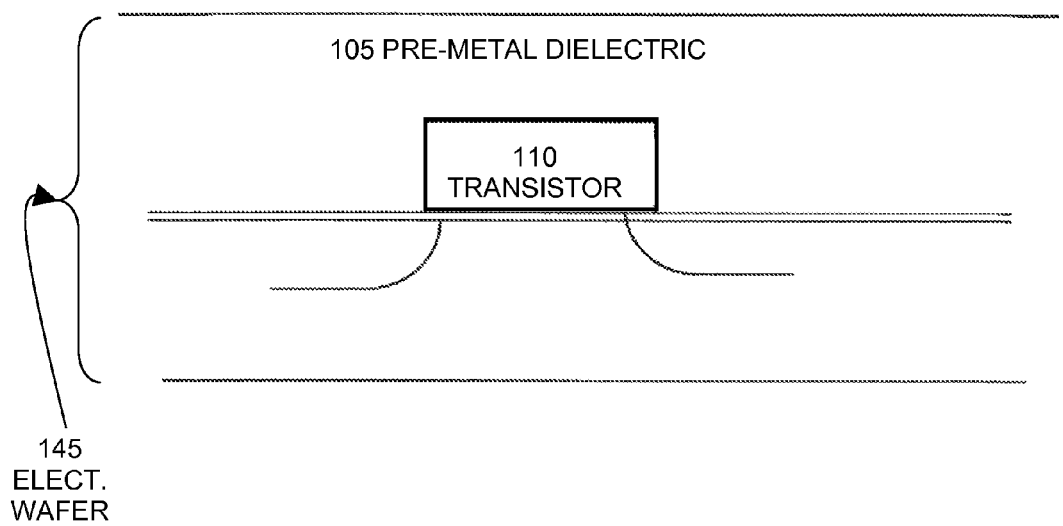
FIG. 1 is a sectional view depicting a transistor within a silicon circuit illustrating a first step of a process for fabricating three-dimensional electronic photonic integrated circuits configured in accordance with an embodiment of the invention.

FIG. 1 depicts a first step 100 of the process of fabricating a standard high performance integrated circuit on high resistivity silicon or silicon-on-insulator substrates up to and including the passivation layer on top of transistors to form a wafer. Shown are a pre-metal dielectric 105 including transistor(s) 110 comprising electronics wafer 145.

Figure 2:
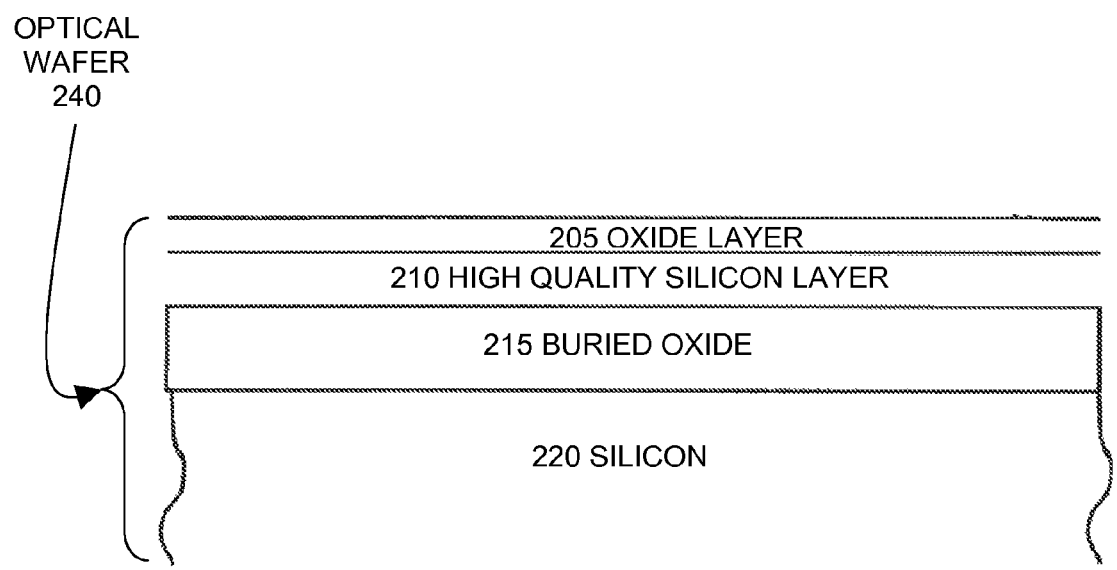
FIG. 2 is a sectional view depicting a wafer with a silicon layer with one side having an oxide layer, a high quality silicon layer, and a second oxide layer illustrating a second step of a process for fabricating three-dimensional electronic photonic integrated circuits configured in accordance with an embodiment of the invention.

FIG. 2 depicts a second step 200 of the process of creating a separately fabricated silicon-on-insulator wafer 240 capped by an oxide layer 205. This wafer has silicon layer 220, topped by buried oxide layer 215, followed by high quality silicon layer 210, and second oxide layer 205 comprising optical wafer 240.

Figure 3:
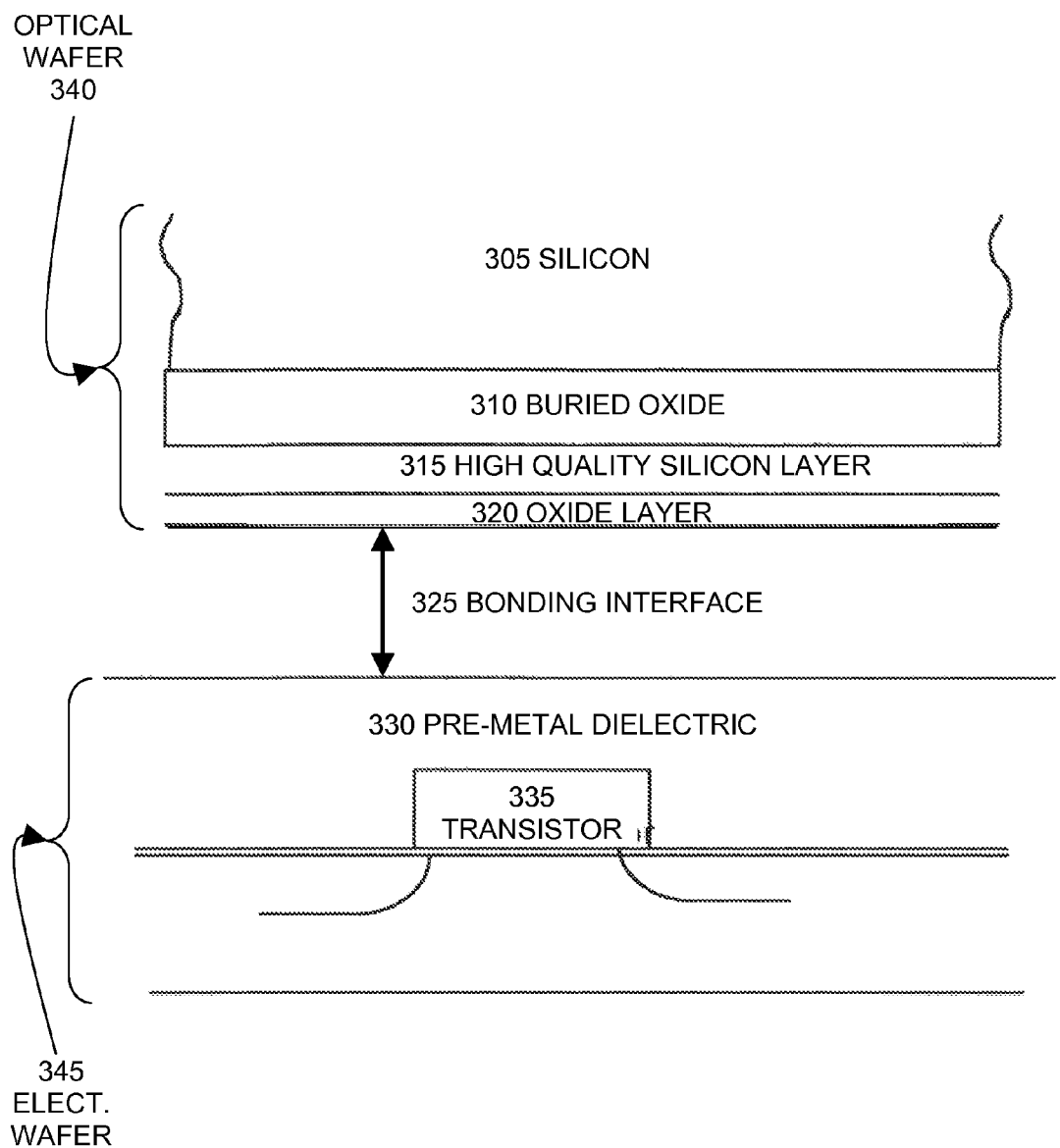
FIG. 3 is a sectional view depicting the transistor within the silicon circuit being bonded to the wafer with a silicon layer illustrating a third step of a process for fabricating three-dimensional electronic photonic integrated circuits configured in accordance with an embodiment of the invention.

FIG. 3 depicts a third step 300 of the process of joining the two wafers at the oxide-to-oxide interface using standard thermal bonding techniques, leaving an exposed top silicon layer in which process elements may be fabricated. As in FIGS. 1 and 2, shown are pre-metal dielectric 330 including transistor(s) 335 comprising electronics wafer 345; separately fabricated silicon-on-insulator wafer 340 has cap oxide layer 320, high quality silicon layer 315, buried oxide layer 310, and silicon layer 305 comprising optical wafer 340.

Figure 4:
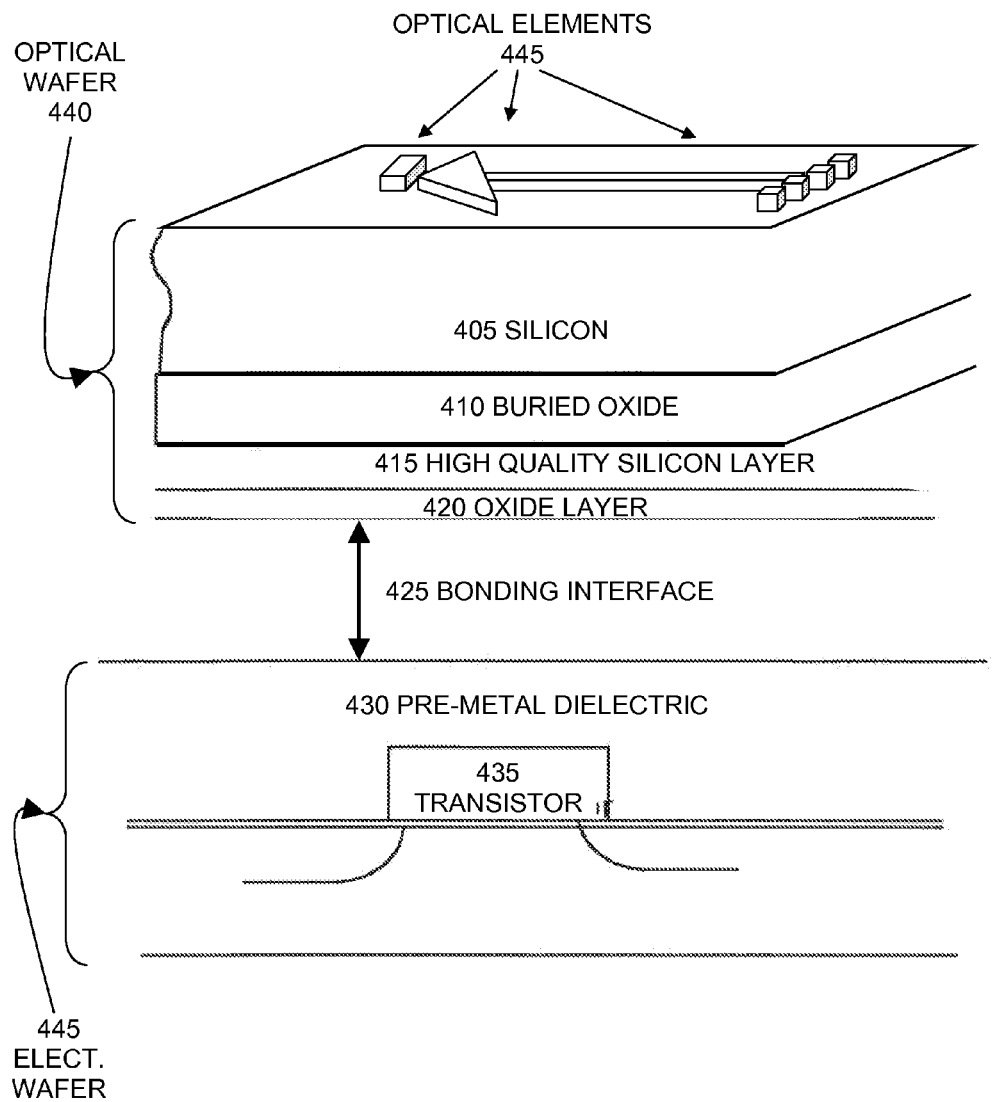
FIG. 4 is a sectional view depicting utilizing the exposed top silicon layer to fabricate photonic process elements, in the silicon layer illustrating a fourth step of a process for fabricating three-dimensional electronic photonic integrated circuits configured in accordance with an embodiment of the invention.

FIG. 4 depicts a fourth step 400 of the process utilizing the exposed top silicon layer to fabricate photonic process elements, e.g. waveguides and photodetectors, in the silicon layer. As in FIG. 3, shown are pre-metal dielectric 430 including transistor(s) 435 comprising electronics wafer 445; separately fabricated silicon-on-insulator wafer 440 has cap oxide layer 420, high quality silicon layer 415, buried oxide layer 410, and silicon layer 405 comprising optical wafer 340. Added are depicted photonic elements 445.

Figure 5:
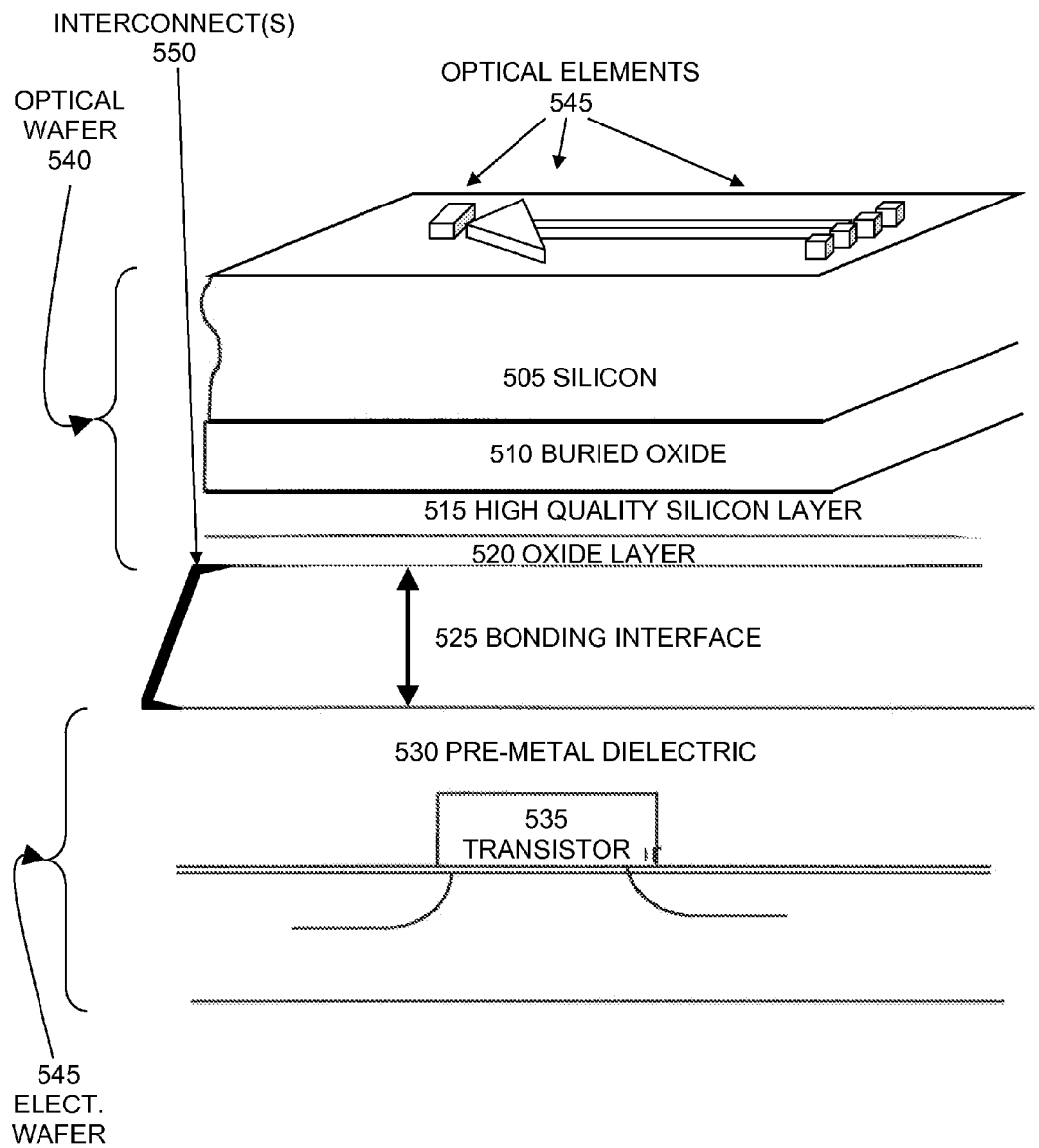
FIG. 5 is a sectional view depicting processing contacts and metallization levels to interconnect the transistors and photonic elements illustrating a fifth step of a process for fabricating three-dimensional electronic photonic integrated circuits configured in accordance with an embodiment of the invention.

FIG. 5 depicts a fifth step 500 of processing contacts and metallization levels to interconnect the transistors and photonic elements to achieve the desired functionality of an electronic-photonic integrated circuit. As in FIG. 4, shown are a pre-metal dielectric 530 including transistor(s) 535 comprising electronics wafer 545; separately fabricated silicon-on-insulator wafer 540 has cap oxide layer 520, high quality silicon layer 515, buried oxide layer 510, silicon layer 505, and photonic elements 545 comprising optical wafer 540. Electronics wafer 545 and photonics wafer 540 are interconnected by contacts and metallization levels 550.

In an alternate embodiment, the first step (step 1 of FIG. 1) of fabricating a standard high performance integrated circuit on high resistivity silicon or silicon-on-insulator substrates up to and including the passivation layer on top of transistors to form a wafer remains the same.

For the alternate embodiment, the second step (step 2 of FIG. 2) of creating a separately fabricated silicon-on-insulator wafer capped by an oxide layer having a silicon layer, topped by a buried oxide layer, followed by a high quality silicon layer, and a second oxide layer also remains the same.

For the alternate embodiment, the third step is altered such that the photonic process elements are fabricated now, rather than after the step of joining the wafers (step 4 of FIG. 4).

For the alternate embodiment, the fourth step—previously step 3 of FIG. 3—comprises joining the two wafers at the oxide-to-oxide interface using standard thermal bonding techniques, leaving an exposed top silicon layer in which process elements may be fabricated, as previously.

For the alternate embodiment, the fifth step concludes the process with of the alternate embodiment by processing contacts and metallization levels to interconnect the transistors and photonic elements to achieve the desired functionality of an electronic-photonic integrated circuit (same as previous step 5 of FIG. 5).

Figure 6:
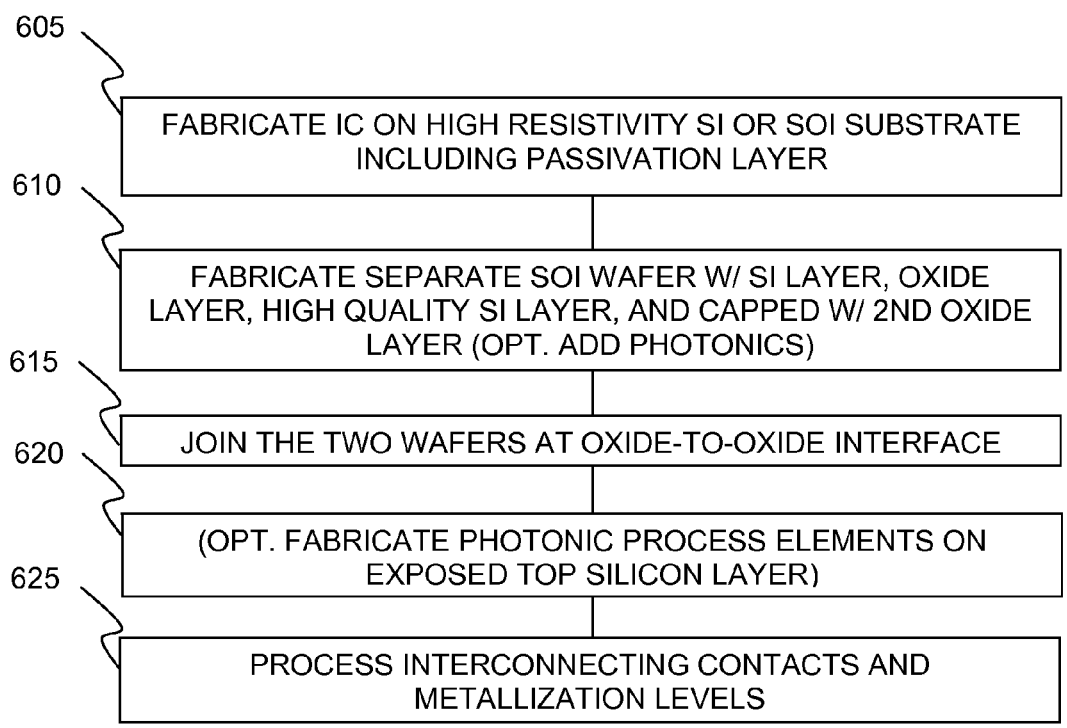
FIG. 6 illustrates a flow chart of the fabrication process configured in accordance with an embodiment of the invention.

FIG. 6 is a flow chart 600 of the fabrication process. Steps comprise fabricating a standard high performance integrated circuit on a high resistivity silicon or a silicon-on-insulator substrate up to and including the passivation layer on top of transistors to form a wafer 605; creating a separately fabricated silicon-on-insulator 'photonics' wafer having a silicon layer, topped by an oxide layer, followed by a high quality silicon layer and a second oxide layer 610; (in embodiments, photonics are formed next, before joining); joining the two wafers at the oxide-to-oxide interface 615; fabricating photonic process elements (e.g. waveguides and photodetectors) on exposed top silicon layer 620 (unless previously completed after step two); and processing contacts and metallization levels to interconnect the transistors and photonic elements 625.

The foregoing description of the embodiments of the invention has been presented for the purposes of illustration and description. It is not intended to be exhaustive or to limit the invention to the precise form disclosed. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A method for fabricating a three-dimensional electronic photonic integrated circuit comprising:
   fabricating an integrated circuit wafer;
   fabricating separately a silicon-on-insulator photonic wafer;
   either joining said wafers at an oxide-to-oxide interface, or fabricating photonic process elements in said photonic wafer;

fabricating photonic process elements in said photonic wafer if not previously accomplished; and interconnecting said transistors and said photonic process elements, layers of said three-dimensional electronic photonic integrated circuit comprise, in order, an active photonics layer, a buried first oxide layer, a high quality silicon layer, a second oxide layer, a bonding electrical interface, a pre-metal dielectric layer, and active electrical components;

whereby functionality of an electronic-photonic integrated circuit is obtained.

2. The method of claim 1, wherein said integrated circuit wafer comprises a high resistivity silicon substrate.

3. The method of claim 1, wherein said integrated circuit wafer comprises a silicon-on-silicon insulator substrate.

4. The method of claim 1, wherein said integrated circuit wafer comprises a passivation layer.

5. The method of claim 1, wherein said integrated circuit wafer comprises a passivation layer on top of at least one transistor.

6. The method of claim 1, wherein said silicon-on-insulator photonics wafer comprises said second oxide layer, and said second oxide layer is an oxide layer cap.

7. The method of claim 1, wherein said joining comprises standard thermal bonding techniques.

8. The method of claim 1, wherein said silicon-on-insulator photonic wafer comprises a top silicon layer.

9. The method of claim 1, wherein said photonic process elements are fabricated in a top silicon layer of said photonic wafer.

10. The method of claim 1, wherein said interconnecting step comprises contacts and metallization levels, and interconnections of said interconnecting step are formed after bonding of said integrated circuit wafer and said photonic wafer.

11. A three-dimensional electronic photonic integrated circuit device manufactured by a process comprising:
fabricating an integrated circuit wafer;
fabricating separately a silicon-on-insulator photonic wafer;
either joining said wafers at an oxide-to-oxide interface, or fabricating photonic process elements in said photonic wafer;
fabricating photonic process elements in said photonic wafer if not previously accomplished; and
interconnecting said transistors and said photonic process elements, layers of said three-dimensional electronic photonic integrated circuit comprise, in order, an active photonics layer, a buried first oxide layer, a high quality silicon layer, a second oxide layer, a bonding electrical interface, a pre-metal dielectric layer, and active electrical components;

whereby functionality of an electronic-photonic integrated circuit is obtained.

12. The device of claim 11, wherein said integrated circuit wafer comprises a high resistivity silicon substrate.

13. The device of claim 11, wherein said integrated circuit wafer comprises a silicon-on-silicon insulator substrate.

14. The device of claim 11, wherein said integrated circuit wafer comprises a passivation layer.

15. The device of claim 11, wherein said integrated circuit wafer comprises a passivation layer on top of at least one transistor.

16. The device of claim 11, wherein said silicon-on-insulator photonics wafer comprises said second oxide layer, and said second oxide layer is an oxide layer cap.

17. The device of claim 11, wherein said joining comprises standard thermal bonding techniques.

18. The device of claim 11, wherein said photonic process elements are fabricated in a top silicon layer of said photonic wafer.

19. The device of claim 11, wherein said interconnecting step comprises contacts and metallization levels, and interconnections of said interconnecting step are formed after bonding of said integrated circuit wafer and said photonic wafer.

20. A three-dimensional electronic photonic integrated circuit manufactured by a process comprising:
fabricating a standard high performance integrated circuit wafer on a high resistivity silicon or a silicon-on-silicon insulator substrate up to and including a passivation layer on top of at least one transistor;
fabricating a silicon-on-insulator photonic wafer capped by an oxide layer;
fabricating photonic process elements in a top silicon layer of said photonic wafer;
joining said wafers at an oxide-to-oxide interface using standard thermal bonding techniques; and
interconnecting said transistors and said photonic process elements with contacts and metallization levels to achieve functionality of an electronic-photonic integrated circuit;
wherein layers of said three-dimensional electronic photonic integrated circuit comprise, in order, an active photonics layer, a buried first oxide layer, a high quality silicon layer, a second oxide layer, a bonding electrical interface, a pre-metal dielectric layer, and active electrical components.

* * * * *